(12) United States Patent
Volk

(10) Patent No.: US 6,490,912 B1
(45) Date of Patent: Dec. 10, 2002

(54) PROBE FOR SENSING THE CHARACTERISTICS OF A SURFACE OF A WORKPIECE

(75) Inventor: Raimund Volk, Schwenningen (DE)

(73) Assignee: Hommelwerke GmbH, Schwenningen (DE)

(*) Notice: Subject to any disclaimer, the term of this patent is extended or adjusted under 35 U.S.C. 154(b) by 14 days.

(21) Appl. No.: 09/695,991

(22) Filed: Oct. 26, 2000

(30) Foreign Application Priority Data

Nov. 2, 1999 (DE) .......................... 199 52 592

(51) Int. Cl.⁷ .................. G01B 21/20; G01B 21/30; G01P 15/16
(52) U.S. Cl. .......................... 73/104; 73/105
(58) Field of Search .................... 73/104, 105

(56) References Cited

U.S. PATENT DOCUMENTS

| | | | |
|---|---|---|---|
| 4,422,322 A | 12/1983 | Spangler | |
| 5,850,289 A | 12/1998 | Fowler et al. | |
| 5,869,751 A | * 2/1999 | Bonin | 73/100 |

FOREIGN PATENT DOCUMENTS

| | | |
|---|---|---|
| DE | 26 60 993 | 6/1978 |
| DE | 27 25 072 | 12/1978 |
| DE | 35 43 906 | 6/1987 |
| DE | 41 32 724 | 4/1993 |
| DE | 196 37 554 | 3/1997 |

OTHER PUBLICATIONS

German Office Action of Aug. 10, 2000 including translation.

* cited by examiner

*Primary Examiner*—Daniel S. Larkin
(74) *Attorney, Agent, or Firm*—Shlesinger, Arkwright & Garvey LLP

(57) ABSTRACT

The invention pertains to a probe for sensing the characteristics of a surface of a workpiece which contains a probe tip that is movably held and prestressed essentially in the direction of the tip (Z-direction) and mounted without play to a first acceleration transducer. The first acceleration transducer transforms the movements of the probe tip and consequently the measurement data into acceleration data, with the first acceleration transducer being movably held and prestressed in the direction of the tip (Z-direction) and fixedly connected to the probe tip. A first integrator performs double integration with respect to time of the acceleration data from the first acceleration transducer, thereby forming longitudinal measurement data which correspond to the features of the sensed surface. The probe is thus able to sense the shape as well as the undulations, or roughness of the surface of a workpiece and outputs the features in the form of a corresponding measurement voltage.

12 Claims, 3 Drawing Sheets

PROBE FOR SENSING THE CHARACTERISTICS OF A SURFACE OF A WORKPIECE

FIELD OF THE INVENTION

The present invention relates generally to a probe for sensing and measuring the shape, undulations, or roughness of a surface.

BACKGROUND OF THE INVENTION

Probes of the pertinent type are publically known. Depending on the design, they make it possible to sense and measure the shape, undulations, or roughness of a surface. In the following description, the term "characteristics" includes all three sensing and measuring options.

A probe for sensing the characteristics of a surface of a workpiece is known from DE 26 60 993 C2. This probe contains an electromechanical measuring transducer; the probe arm of the measuring transducer is provided with a probe tip and is prestressed in the sensing direction. The entire measuring probe is mounted on a feed unit that guides the probe tip of the measuring transducer over the surface to be examined. The measuring transducer transforms the movements of the probe tip in the direction of the tip (Z-direction) into corresponding measurement data. Since the feed unit moves the measuring transducer at constant speed, the measurement data can be recorded, e.g., on a paper tape that also runs at a constant speed as a function of time. In this case, a linear dependence is always assumed; however, a constant feed movement is a prerequisite for such a linear dependence, so that there are strict requirements for maintaining the feed movement constant. This means that a feed unit which meets these strict requirements must be provided. In addition, such a feed unit requires special measures to maintain the electromechanical measuring transducer within its operation region, e.g., such as those described in DE 27 25 072 A1 and DE 41 32 724 A1, if the surface to be sensed is not flat due to the shape of the workpiece to be sensed or due to excessive undulations, i.e., if a change in the direction of the advance movement is necessary. However, the shape or undulations, of the surface are not reflected in the form of a measuring voltage by the measuring transducer; thus, the shape or undulations, of the surface are lost.

DE 35 43 906 A1 discloses a probe for sensing the features of a workpiece surface with a probe tip that is arranged on a probe arm that can be pivoted essentially in the direction of the tip about a pivot bearing, with the probe tip being arranged at a certain distance from the pivot bearing. This probe also contains a transducer for transforming the movements of the probe tip into corresponding measurement data.

DE 35 43 906 A1 also describes a probe for sensing the features of a workpiece surface and contains a base body, a means for realizing a uniform linear movement of the base body in the sensing direction, a probe arm that is arranged on the base body and that can be pivoted about a pivot bearing, a probe tip that is arranged on the probe arm at a distance from the pivot bearing, and a measuring transducer for generating a measurement signal as a function of the movements of the probe tip in the direction of the tip while sensing a surface.

DE 196 37 554 A1 discloses a device for sensing the characteristics of a surface of a workpiece which contains a movably held probe tip, transducers for transforming the movements of the probe tip into corresponding measuring values and additional transducers for transforming the movements of the measurement probe that carries the probe tip into corresponding measurement data. The additional transducers consist of acceleration transducers, some of which are realized in the form of rotary acceleration transducers, which transform the pertinent measurement data into acceleration data. These transducers are connected without rotational play to the measuring probe, where an integrator that performs a double integration of the acceleration data over time as used to form the longitudinal dimensions that correspond to the positions of the measuring probe. Acceleration transducers only serve for measuring the portion of the probe tip movement that the probe tip carries out due to the movement of the measuring probe that carries the probe tip, primarily for measuring and correcting a generally undesirable relative movement between the measuring probe and the object to be measured.

U.S. Pat. No. 4,422,322 discloses a device for sensing the features of a road surface. A measuring vehicle with its wheels that roll on the road surface to be sensed serves as the measuring element. A transducer serves for transforming the movements of the measuring vehicle perpendicular to the road surface into corresponding measurement data, where the transducer consists of an acceleration transducer that transforms the measurement data into acceleration data and is rigidly connected to the spring-suspended mass of the measuring vehicle. An integrator performs a double integration of the acceleration data with respect to time [sic; with respect to distance] in order to form longitudinal measurement data that correspond to the features of the sensed road surface. This known device is not suitable for sensing the surface of a workpiece.

U.S. Pat. No. 5,850,289 discloses a device for sensing an object in order to determine its shape and three-dimensional surface characteristic. In this case, the sensing device is freely moved relative to the object and the movement or position data of the sensing device is determined by means of an acceleration transducer. The sensing takes place in such a way that a visual pattern is projected onto the surface of the object and the changes in the pattern are visually examined, with a signal for correcting the movement of the sensing device being formed therefrom. This known device is not suitable for sensing the roughness of the surface of a workpiece.

OBJECTS AND SUMMARY OF THE INVENTION

The invention is based on the objective of developing a probe for sensing the features of a workpiece surface, i.e., the shape, undulations, or roughness, which makes it possible to sense and transform into corresponding measurement data arbitrary irregularities of the workpiece surface, i.e., its shape, undulations, or roughness.

The basic idea of the invention consists of measuring the accelerations or speeds caused by the excursions rather than measuring the excursions of a probe tip during the sensing of the surface, with the value of the excursion subsequently being determined from said accelerations or speeds by means of an integration with respect to time.

According to one embodiment of the invention, linear accelerations are evaluated for this purpose. According to the present invention, the first transducer is realized in the form of a first acceleration transducer that transforms the measurement data into acceleration data, where said acceleration transducer is movably held and prestressed in the direction of the tip (Z-direction) and rigidly connected to the probe tip. Consequently, this first acceleration transducer is able to measure a wide range of movements, i.e., substantial differences in height that correspond to the shape of the surface, less substantial differences in height that correspond to undulations, of the surface, and minute differences in height that correspond to roughness of the surface. The desired measuring values can be separated from one another by means of a downstream filter, namely, a low-pass filter for the shape, a bandpass filter for the undulations, and a high-pass filter for the roughness.

According to an additional refinement of this embodiment of the invention, a second acceleration transducer is provided for transforming the movements of the probe in the longitudinal direction (X-direction), which is essentially perpendicular to the direction of the tip (Z-direction), into corresponding acceleration data. A second integrator that performs a double integration of the movements of the second acceleration transducer with respect to time and thus transforms the movements into longitudinal movement data, is connected in series with this second acceleration transducer. In this context, the term "movement" refers to a movement of the probe normal to the measuring direction (Z-direction). This movement can be arbitrarily realized during a measuring process carried out with the probe. With known probes, this movement can be realized with a feed unit, the speed of which does not have to be constant as it was with the case with feed units known thus far. On the contrary, a significant advantage of the invention is that the movement over the surface to be sensed can also be realized manually, i.e., the speed of the movement need not be constant. The actual progression of the movement and consequently the sensed distance is, according to the invention, subsequently calculated by carrying out the aforementioned double integration. Since the acceleration data of the first acceleration transducer are also integrated twice as a function of time analogous to the movement data of the second acceleration transducer, the measuring movements, i.e., the respectively measured height values, are consequently assigned to the respective locations of the probe during its movement in the longitudinal direction (X-direction) such that the height progression of the surface of the workpiece is precisely determined.

According to a practical, additional refinement of this embodiment of the invention, reproduction means are provided, to which the longitudinal measurement data and the longitudinal movement data are fed, such that they are able to reproduce the excursions of the probe tip in the direction of the tip (Z-direction) as a function (z (x)) of the movement of the probe tip in the longitudinal direction that is normal (X-direction) to the direction of the tip (Z-direction). In this case, the reproduction means may consist of a picture tube or a paper tape, on which the measurement data is displayed as a function of the longitudinal movement data.

According to a practical additional refinement of this embodiment of the invention, it is proposed that a third acceleration transducer be provided that transforms lateral movements (y direction) of the probe perpendicular to the direction of the tip (Z-direction) and perpendicular to the longitudinal direction (X-direction) into corresponding lateral movement data, with a third integrator being provided that performs a double integration of the lateral acceleration data as a function of time, and thus, transforms the lateral acceleration data into corresponding lateral movement data which is fed to the reproduction means, in such a way that the topography of the surface sensed by the probe tip is produced by the reproduction means. It is thus possible to move the probe over the surface to be sensed in arbitrary directions normal to the direction of the tip (Z-direction). In this case, the probe travels on new sensing paths during each movement and the topography of the sensed surface is obtained if the density of the these sensing paths is sufficiently high.

In practical embodiments, the integrators which perform double integration of the signals of the acceleration transducers as a function of time are formed by two individual integrators connected in series.

The data delivered by the acceleration transducers may consist of analog data, in which case analog/digital converters are connected in series with the acceleration transducers. The output signals of these analog/digital converters are doubly integrated as a function of time by digital integrators connected in series. As mentioned previously, bandpass filters may be arranged ahead of the analog/digital converters in order to filter out certain frequency ranges, e.g., frequency ranges that correspond to the shape, undulations, or roughness of the surface.

As mentioned previously, the reproduction means may be realized in the form of a picture tube or a writing device, e.g., a chart recorder.

According to the invention, the probe tip is connected without rotational play to the first acceleration transducer. Depending on the type of construction of the acceleration transducer, this means that the mass of the acceleration transducer must be moved by the probe tip. During fast sensing movements, correspondingly high accelerations can occur and subject the probe tip to high stress that results in correspondingly high wear. In light of this, it is practical to connect the probe tip to the first acceleration transducer in such a way that it can be replaced. Naturally, it would also be conceivable to provide the probe tip with different tip radii such that the probe tip only carries out more significant excursions, e.g., excursions that correspond to the undulations or the shape of the surface. Consequently, high accelerations and the associated high wear of the probe tip are prevented.

It is practical to provide a damping means which damp the movements of the first acceleration transducer and consequently suppress natural oscillations or resonances.

The first and the second acceleration transducer can be arranged in a common housing together with the first and the second integrator and the reproduction means, with the probe tip protruding out of said housing. Consequently, it is possible to guide the housing manually over the surface to be sensed in such a way that the probe tip glides over the surface. The height contour of the sensed track on the surface then appears on the reproduction means.

In this embodiment, the housing preferably is in the form of a pen, with the probe tip protruding from the tip of the housing. Thus, when sensing the surface, the probe behaves as if a line were drawn on the surface of the workpiece with a pen. During this sensing process, the characteristics of the surface of the workpiece, i.e., the surface contour, the undulations, or the roughness, depending on the filtering process, appears on the display.

According to another embodiment of the basic idea of the invention, the rotational accelerations or rotational speeds of the probe arm are evaluated, with the probe tip being situated on said probe arm. The rotational angles are then determined from the rotational acceleration data by carrying out a double integration as a function of the time, with the excursions of the probe tip being calculated therefrom. Once the rotational speed is determined, the rotational angles are determined by carrying out a single integration as a function of time and calculating the excursions therefrom. Here, the sensing movement (in the X-direction) is uniformly linear.

The basic idea of invention can also be practically realized in such a way that a first acceleration sensor, the sensing direction of which lies in the pivoting plane of the probe arm, is arranged on the probe arm, where this first acceleration sensor delivers a first output signal a that is fed to a computer that multiplies the first output signal a by the radius r that represents the distance between the probe tip and the pivot bearing. Means for realizing a uniform linear movement of a base body that holds the probe arm are provided. Due to this uniform linear movement, the first acceleration sensor is not subject to any accelerations, i.e., no output signal is generated. This output signal is generated due to the fact that the effect of the gravitational acceleration on the acceleration sensor changes during an excursion of the probe arm, with the acceleration sensor delivering an output signal that depends on the inclination of the acceleration sensor arranged on the probe arm relative to the direction of the gravitational acceleration. Since the angle of the excursion of the probe arm during the sensing of a surface by the probe tip is a function of the radius r that represents the distance between the probe tip and the pivot bearing of the probe arm, a value for the movement of the probe tip in the direction of the tip (Z-direction) can be determined by taking into consideration the radius r.

In this case, it is advantageous if the sensing direction extends parallel to the direction of the tip (Z-direction) and the linear movement of the base body extends parallel to the earth's surface, such that the output signal a of the first acceleration sensor corresponds to the sine of the angle of inclination a of the probe arm relative to the earth's surface. If the angles of inclination are not excessively large, a primarily linear dependence between the angle of inclination and the excursion of the probe tip exists under these circumstances.

A particularly practical additional refinement of this embodiment of the basic idea of the invention is characterized by the fact that a second acceleration sensor, the sensing direction of which forms an angle of 90° with the first acceleration sensor in the pivot plane of the probe arm, is provided, where this second acceleration sensor delivers a second output signal b. The angle α can then be determined from these two output signals a and b from arctan a/b, with the excursion of the probe tip z then being determined from r sin α. Consequently, in this embodiment of the basic idea of the invention, it is not necessary to move the probe in a certain direction or to maintain a certain position of the probe relative to the direction of gravitational acceleration.

The acceleration sensors used in realizing the invention are generally known. For example, they contain a small weight that is suspended by springs, with the excursion of said weight due to accelerations being measured capacitively.

The invention is described in greater detail below with reference to the figures.

DETAILED DESCRIPTION OF THE INVENTION

Figure 1:
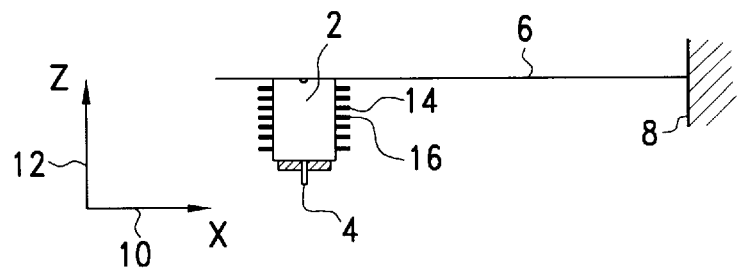
FIG. 1 schematically shows the mechanical design of a first embodiment of the basic idea according to the invention which contains a linear acceleration transducer.

FIG. 1 schematically shows an acceleration transducer 2, to which a probe tip 4 is rigidly attached. The acceleration transducer is mounted on a flat spring 6 that is arranged on a schematically illustrated holding arrangement 8 which, for example, has the form of a housing or the like and serves for guiding the probe tip 4 over the surface of the workpiece to be examined in the longitudinal direction (X-direction) indicated by the arrow 10. During this process, the probe tip 4 carries out movements in the tip direction (Z-direction), which is represented by the arrow 12, together with the acceleration transducer 2 as a function of the surface features. The acceleration transducer 2 outputs acceleration data from a terminal 14 which are additionally processed in a downstage circuit arrangement according to FIG. 2. The acceleration transducer 2 is also designed in such a way that it outputs acceleration data from a terminal 16 due to accelerations in the X-direction.

Figure 2B:
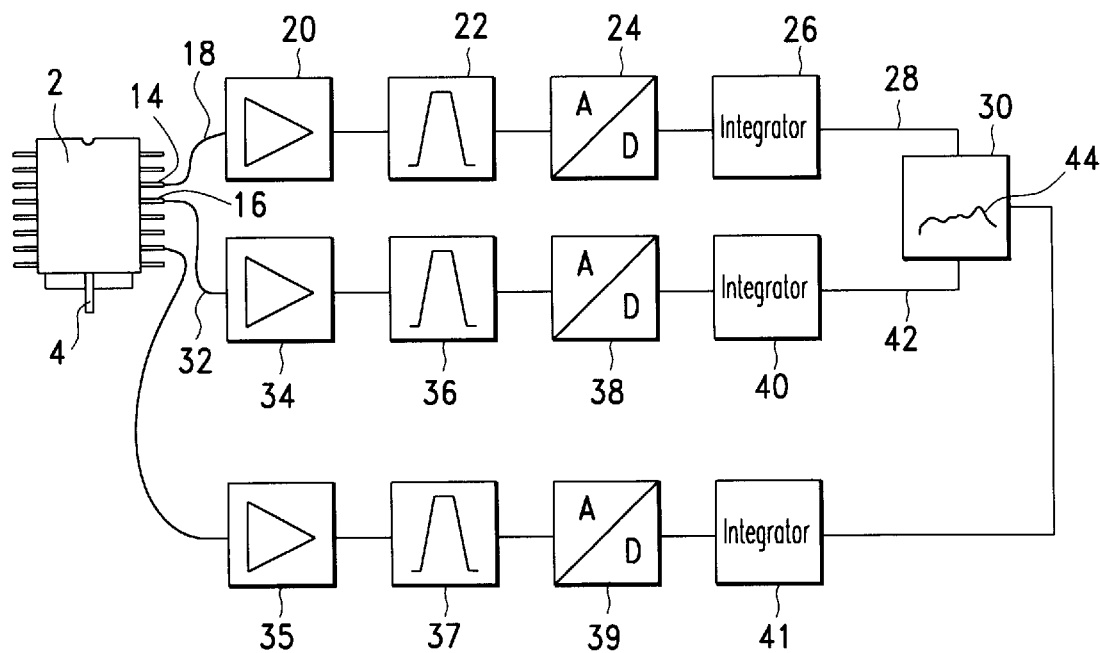
FIG. 2B is an embodiment similar to FIG. 2A, showing a transducer that transforms the movement of the probe tip in the X-, Y- and Z-directions.
Figure 2A:
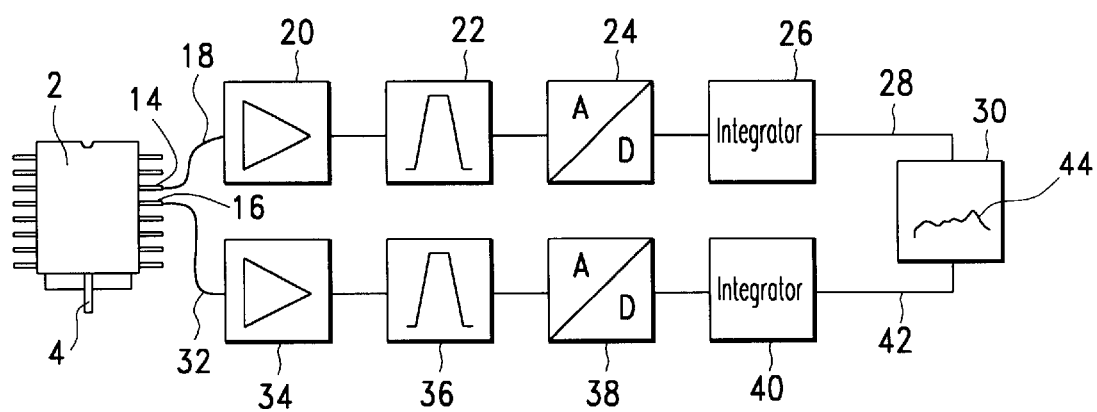
FIG. 2A shows the electrical portion of the embodiment according to FIG. 1 in the form of a block diagram.

FIG. 2A shows a block diagram of the electronic circuit for processing the acceleration signals output from the terminals 14 and 16. These acceleration signals are output by the acceleration transducers that act in the direction of the arrows 10 and 12, namely by the element that is generally referred to as the acceleration transducer 2. The terminal 14 is connected to an amplifier 20, the output of which is connected to an analog/digital converter 24 via a bandpass filter 22, by means of a very flexible line 18, with said analog/digital converter converting the acceleration signals that appear in analog form at the terminal 14 into digital signals that undergo double-integration with respect to time by a connected integrator 26. Consequently, measuring signals which are proportional to the excursion of the probe tip 4 in the Z-direction (arrow 12) appear at the output line 28 of the integrator. These measuring signals are also fed to a vertical input of a picture tube 30. The elements 18–28 form the z channel of the electronic circuit.

Accordingly, the terminal 16 is connected to an integrator 40 via a very flexible line 32, an amplifier 34, a bandpass filter 36 and an analog/digital converter 38, where the integrator takes the double-integral of the digital output signal of the analog/digital converter 38 over time such that a signal that corresponds to the distance traveled by the probe tip 4 in the direction of the arrow 10 appears at the output line 42 of the integrator 40. The output line 42 is connected to the horizontal input of a picture tube 30 such that a curve 44 which corresponds to the characteristics of the sensed surface of a workpiece appears on the monitor.

The electronic unit with the elements 18–44 according to FIG. 2A may be combined in a common housing together with the elements 2–16 shown in FIG. 1. The probe tip 4 protrudes from this common housing such that it is merely required to guide the probe tip over the surface to be sensed at arbitrary speed, such that the probe tip 4 follows the features of the surface. In this case, the speed in the X-direction (arrow 10) is not important because the excursion of the probe tip 4 is calculated from the accelerations in the X-direction. However, the elements 18–44 may also be arranged separately from the elements shown in FIG. 1. In this case, however, the lines 18–32 must be extended, if necessary, by adding an additional cable.

Referring to FIG. 2B, an embodiment is shown where another acceleration transducer is provided in transducer 2 to transform the lateral movements of the tip 4 in a Y-direction which extends perpendicular to the direction of the tip (Z-direction) and perpendicular to the longitudinal direction (X-direction) into corresponding lateral acceleration data. An integrator 41 is provided for double integration with respect to time of the lateral acceleration data, thereby transforming the lateral acceleration data into corresponding lateral movement data which are fed to the picture tube 30 to reproduce the topography of the surface sensed by the probe tip. A bandpass filter 37 and an analog/digital converter 39, where the integrator takes the double-integral of the digital output signal of the analog/digital converter 38. The output of the transducer 2 is connected to an amplifier 35, the output of which is connected to the analog/digital converter 39 via a bandpass filter 37.

Figure 3:
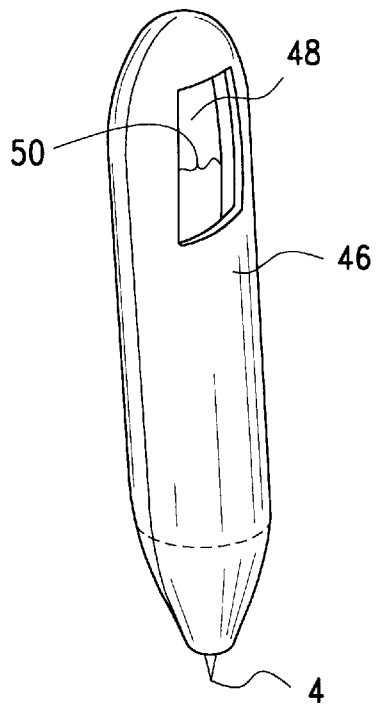
FIG. 3 shows a perspective representation of a practical embodiment in the form of a pen.

FIG. 3 shows a perspective representation of a housing 46 in the form of a pen, in which all elements shown in FIGS. 1 and 2 as well as a power supply battery are arranged. The probe tip 4 protrudes from this housing, and the monitor which is realized in the form of a display 48 in this case is visible through a window in the housing 46, so that a curve 50 appears when the housing 46 is guided over the surface to be sensed by the probe tip 4. In the embodiment according to FIG. 3, the housing 46 corresponds to the holding arrangement 8 in FIG. 1, and the schematically illustrated flat spring 6 according to FIG. 1 naturally is replaced with a suitable spring construction for structural reasons.

Figure 4:
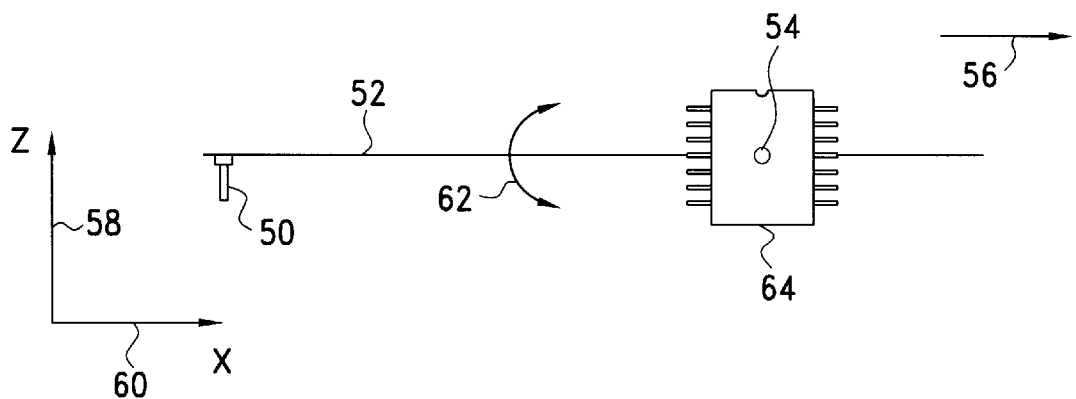
FIG. 4 schematically shows another practical embodiment of the basic idea of the invention which utilizes gravitational acceleration, and FIG. 5 schematically shows the design of the acceleration sensor that is schematically illustrated in FIG. 4.

FIG. 4 schematically shows an embodiment of another variant of the basic idea of the invention. A probe tip 50 is arranged on a probe arm 52 that can be pivoted about a pivot bearing 54 at a distance r from the pivot bearing, and held on a (not shown) base body that undergoes uniform, linear movement in the direction of the arrow 56 by a (not shown) feed unit. During this sensing movement, the probe tip conventionally makes contact with the surface to be sensed with slight pressure. During this process, the probe tip 50 is subjected to excursions in the direction of the tip which is designated as the Z-direction and represented by an arrow 58. The movement of the probe in the direction of the arrow 56, relative to the z direction, is represented by an arrow 60 and is designated the X-direction. During the excursions of the probe tip 50 in the Z-direction, the probe arm 52 carries out pivoting movements in the direction of the double arrow 62.

A measuring transducer 64 is connected to the probe arm 52 within the region of the pivot bearing 54 such that the measuring transducer participates in the pivoting movements of the probe arm 52 about the pivot bearing 54.

Figure 5:
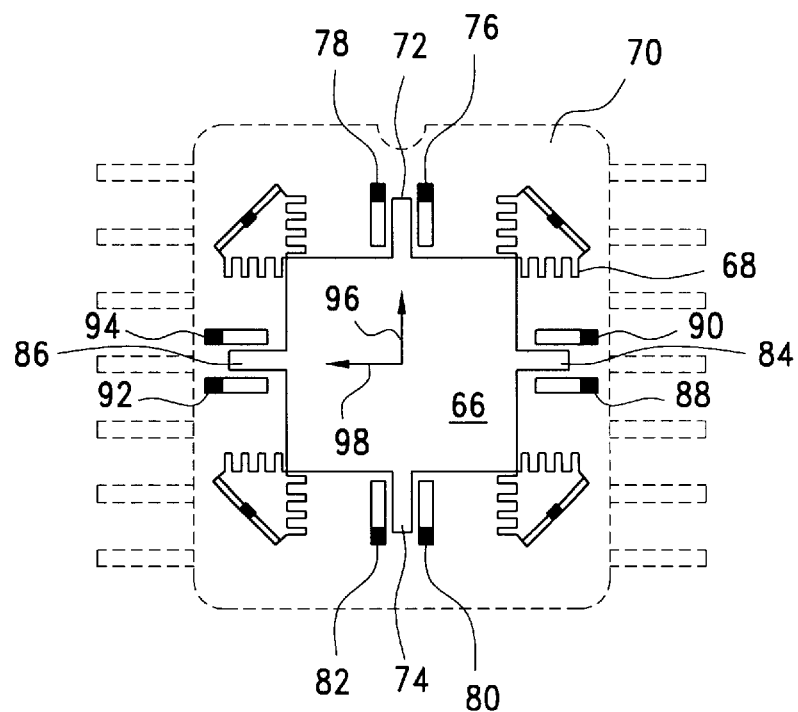

FIG. 5 schematically shows an enlarged representation of the internal design of the measuring transducer 64 according to FIG. 4. The measuring transducer contains a small weight 66 that is held in free-floating fashion on a housing 70 by small springs 68. Conductive arms 72 and 74, which respectively protrude between two conductive plates 76, 78 and 80, 82 and cause a measurable change in the capacitance with the plates 76–82 or between these plates when the weight 66 is moved in the direction of an arrow 98, are situated on the weight 66. These changes in the position of the weight 66 and consequently the changes in the aforementioned capacitances occur when the probe arm 52 is pivoted in the direction of the double arrow 62 during the sensing process, i.e., when the influence of the gravitational acceleration upon the ability of the weight 66 to carry out an excursion in the direction of the arrow 96 changes.

Additional arms 84, 86 which cooperate with conductive plates of 88, 90 and 92, 94, respectively, similar to capacitors are situated on the weight 66 at an angle of 90° relative to the arms 72, 74. If a gravitational acceleration component is created in the direction of an arrow 98 during a pivoting movement, the capacitance of the plates 88–94 is changed accordingly.

Due to the aforementioned acceleration sensors which are arranged at an angle of 90° relative to one another, the pivot angle a in the direction of the double arrow 52 can be determined in accordance with the formula arctan a/b, where a and b represent the measurement signals from the respective capacitors. Once the angle $\alpha$ is determined, the excursion in the Z-direction of the probe tip 50 can be determined in accordance with the formula z=r sin $\alpha$, with r representing the distance of the probe tip 50 from the pivot bearing 54.

What is claimed is:

1. Probe for sensing the characteristics of a surface of a workpiece, comprising:
    a probe tip that is movably held and prestressed essentially in the direction of the tip in a Z-direction,
    a first acceleration transducer for transforming the movements of the probe tip in the Z-direction into acceleration data and is movably held and prestressed in the Z-direction of the tip, with the first acceleration transducer being fixedly connected to the probe tip, and
    a first integrator is provided for double integration with respect to time of the acceleration data of the first acceleration transducer, thereby transforming the acceleration data into longitudinal measurement data which correspond to the characteristics of the sensed surface.

2. Probe according to claim 1, wherein:
    a second acceleration transducer is provided which transforms the movement of the probe tip in a longitudinal X-direction that essentially extends perpendicular to the Z-direction of the tip into corresponding longitudinal acceleration data, and
    a second integrator is provided for double integration with respect to time of the longitudinal acceleration data of the second acceleration transducer, thereby transforming the longitudinal acceleration data into longitudinal movement data.

3. Probe according to claim 2, wherein reproduction means are provided, with the longitudinal measurement data and the longitudinal movement data being fed to said reproduction means, such that the reproduction means reproduce the excursions of the probe tip in the Z-direction of the tip as a function of the movement of the probe tip in the longitudinal X-direction that extends perpendicular to the Z-direction of the tip.

4. Probe according to claim 3, wherein:
    a third acceleration transducer is provided which transforms the lateral movements in a Y-direction of the probe tip which extends perpendicular to the Z-direction of the tip and perpendicular to the longitudinal X-direction into corresponding lateral acceleration data, and
    a third integrator is provided for double integration with respect to time of the lateral acceleration data, thereby transforming the lateral acceleration data into corresponding lateral movement data which are fed to the reproduction means, such that the reproduction means reproduce the topography of the surface sensed by the probe tip.

5. Probe according to claim 3, wherein the reproduction means is realized in the form of a picture tube.

6. Probe according to claim 3, wherein the reproduction means is realized in the form of a chart recorder.

7. Probe according to claim 3, wherein the first and the second acceleration transducers are movably arranged in a common housing together with the first and the second integrators and the reproduction means, with the probe tip protruding out of the housing.

8. Probe according to claim 7, wherein the housing is in the form of a pen, where the probe tip protrudes from the tip of the housing, and the reproduction means is realized in the form of a display that is arranged in or behind a lateral opening of the housing.

9. Probe according to claim 1, wherein the data from the first acceleration transducer consists of analog data, and an analog/digital converter is connected in series with the first acceleration transducer, where the first integrator is a digital integrator to perform double integration of the output signal of the analog/digital converter with respect to time.

10. Probe according to claim 9, wherein bandpass filter is arranged upstage to the analog/digital converter.

11. Probe according to claim 1, wherein the probe tip is connected to the first acceleration transducer in a replaceable fashion.

12. Probe according to claim 1, wherein the movements of the first acceleration transducer are damped by a damping means.

* * * * *